Figure 1:
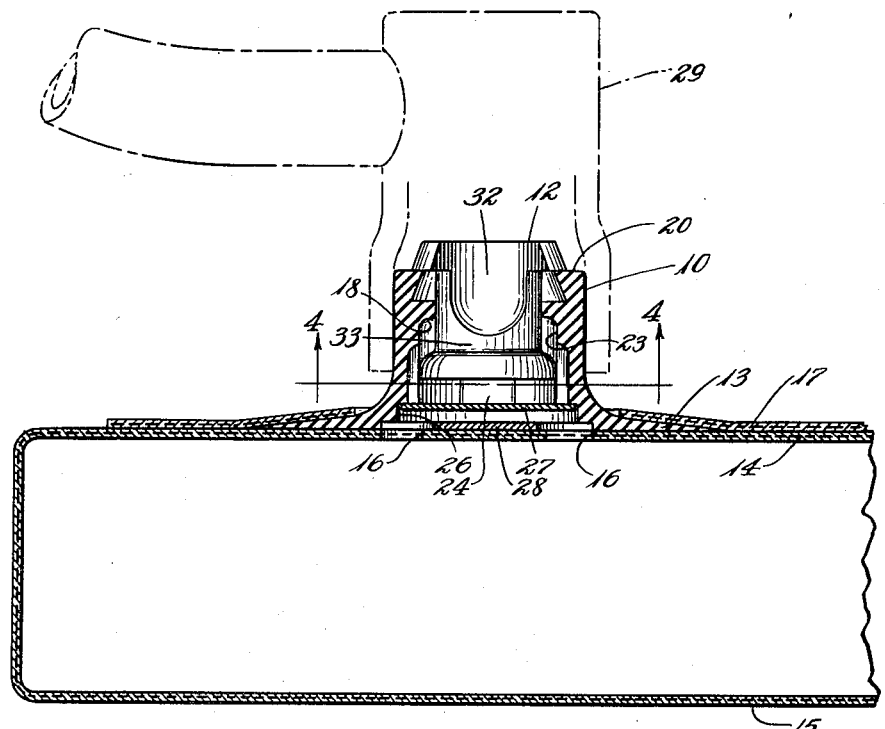

Feb. 8, 1955  V. H. HASSELQUIST  2,701,579

INFLATING VALVE FOR INFLATABLE ARTICLES

Filed Jan. 2, 1952  2 Sheets-Sheet 1

Inventor
Victor H. Hasselquist
By Dwight L. Moody
Atty.

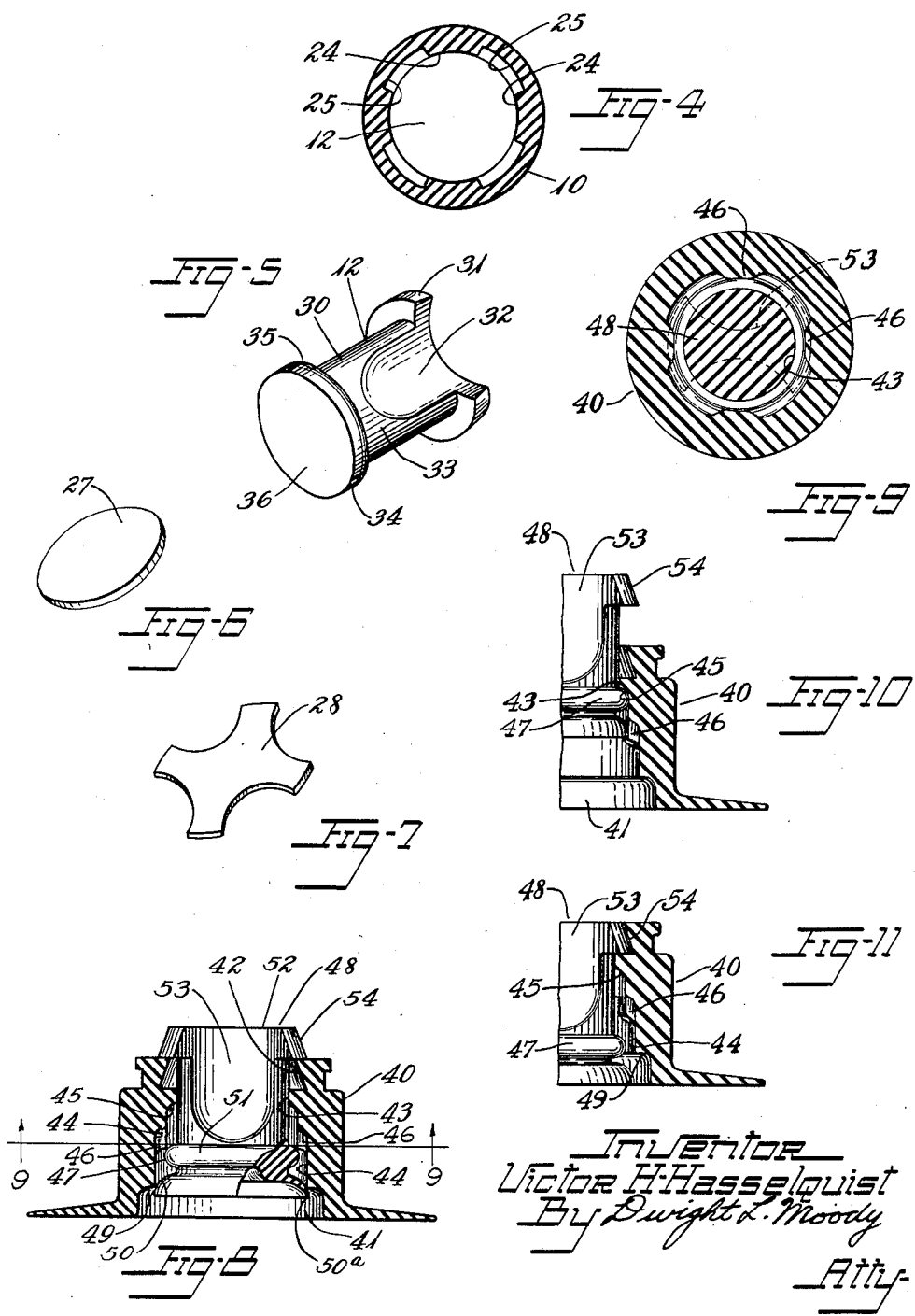

United States Patent Office 2,701,579
Patented Feb. 8, 1955

2,701,579

INFLATING VALVE FOR INFLATABLE ARTICLES

Victor H. Hasselquist, Akron, Ohio, assignor to The B. F. Goodrich Company, New York, N. Y., a corporation of New York Application January 2, 1952, Serial No. 264,423

10 Claims. (Cl. 137—223)

The invention relates to inflating valves of the check valve type suitable for inflating and deflating hollow inflatable articles such, for example, as pneumatic mattresses, toys, boats, liferafts and other large-volume, low-pressure inflatable articles.

Heretofore, check valves for inflating and deflating hollow pneumatic articles of the large-volume, low-pressure type, for the most part have been expensive and difficult to manufacture, have been generally constructed of metal parts that tend to corrode and stick, and have had objectionably restricted openings for the passage of air or other inflating medium. Also, the valves have been assembled from a considerable number of individual parts such, for example, as auxiliary springs, sealing gaskets of leather or rubber or both, miscellaneous metal fittings and screw fasteners, and retaining chains or the like. For these and other reasons the prior valves have not been wholly satisfactory for the intended purpose.

An object of the invention is to provide an improved inflating valve assembly overcoming the foregoing disadvantages and difficulties of the prior valves.

Other objects are to provide for a fully closed and sealed condition, an inflating and temporarily sealed condition, and a deflating and fully opened condition of the improved inflating valve assembly; to provide for accomplishing the three conditions solely by axial sliding movement of one part relative to another part of the valve assembly and for positively maintaining each condition of the valve assembly independent of another condition without resort to expedients such, for example, as auxiliary coil springs or the like, or a threaded engagement of movable parts of the valve assembly; to provide for extensive freedom of passage of an inflating medium through the valve for inflation and deflation purposes; and to provide for simplicity and durability of construction, lightweight, convenience and low cost of manufacture, and for effectiveness and ease of operation.

Further objects are to provide for sealing effectively the valve assembly in the closed condition; to provide for minimum restriction to flow of the inflating medium in one direction through the valve assembly, while temporarily sealing against flow in the other direction through the valve assembly, especially by lip-action flexure of a plug element; to provide for frictional and yieldable engagement of one part with another part of the valve assembly by virtue of axially slidable non-rotative relative movement of the parts and the resilient distortability of one or more of the parts; to provide for axially slidable and limitless rotative movement of the plug element relative to a hollow body of the valve assembly and for resilient distortability of the plug; to provide for guiding the axial sliding movement of the plug; to provide for a molded integral construction of the valve body, or the plug, or both; and to provide for minimizing the number of individual parts of the valve assembly and for preventing accidental loss, corrosion and sticking of the parts.

These and other objects and advantages of the invention will be apparent from the following description.

Figure 2:
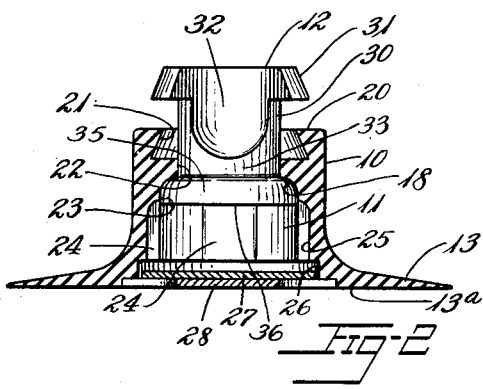
Figure 3:
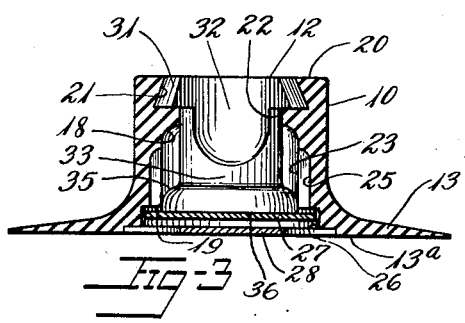

In the accompanying drawings which form a part of this specification and in which like numerals are employed to designate like parts through the same, Fig. 1 is a sectional elevational view of an inflating valve assembly in the inflating condition mounted on a pneumatic mattress and constructed in accordance with and embodying the invention, parts being broken away and broken lines indicating a conduit detachably connected to the valve assembly for conveying an inflating medium, Fig. 2 is a sectional elevational view showing the inflating valve assembly only in the closed, sealed and locked condition, Fig. 3 is a view like Fig. 2 but showing the inflating valve assembly in the deflating condition, Fig. 4 is a sectional view taken along line 4—4 of Fig. 1, Fig. 5 is a perspective view of a disortable plug of the valve assembly, Fig. 6 is a perspective view of a floating valve disc for temporarily sealing the valve assembly while permitting inflation of the mattress, Fig. 7 is a perspective view of a retaining spider for holding the valve disc in its floating relation within the valve assembly, Fig. 8 is a modified construction of the inflating valve assembly shown in Fig. 1 with the valve assembly in the inflating condition, Fig. 9 is a cross-sectional view of the modified valve assembly taken along line 9—9 of Fig. 8, Fig. 10 is a sectional elevational view of the modified valve assembly in the closed, sealed and locked condition, Fig. 11 is a sectional elevational view of the modified valve assembly in the deflating condition, parts being broken away.

The illustrative embodiment of the invention shown in Figs. 1 to 7, inclusive, has a hollow member or valve body 10 having axially spaced-apart, transversely-extending, continuous, annular seating surfaces 18, 19 in the bore 11 thereof, and has mounted within the body 10 a closed plug 12, preferably of distortable material, in axially slidable and limitless rotative relation therewith for providing a seal at each seating surface and for effecting a closed, an inflating, and a deflating condition of the valve body and plug assembly.

The hollow valve body 10 may be of generally cylindrical or other desired shape having the bore 11 extending centrally and axially from one end 20 to the other end 13a of the body, and may be made of distortable material such, for example, as resilient rubber, natural or synthetic, or other rubber-like material. When the valve body is made of suitable resilient rubber composition, reinforced or unreinforced, it can be produced by molding and vulcanizing under heat and pressure so as to have limited yieldability and distortability in the vulcanized state.

The generally cylindrical valve body 10 shown in Figs. 1 to 3, inclusive, may have at its end 13a a continuous, annular attaching flange 13 of tapered section adhesively attached as by rubber cement (not shown) to a distensible apertured wall 14 of a pneumatic mattress 15 of airtight flexible material in overlying relation to the wall 14 so that the bore 11 of the body is in communication with one or more apertures 16, 16 in the wall 14 to permit the flow of an inflating medium such, for example, as air to and from the interior of the pneumatic mattress 15. An annular protective cover patch 17 of suitable airtight flexible material may be adhesively attached to both the attaching flange 13 and the wall 14 in overlying and overlapping relation thereto.

The axial bore 11 in the valve body 10 has a stepped or counter-bored arrangement for accommodating axial sliding and limitless rotative movement of the distortable closed plug 12 to effect an inflating condition, a closed and locked condition, and a deflating condition, respectively, of the valve assembly, as shown in Figs. 1, 2, and 3, and for providing the axially spaced-apart, transversely-extending, continuous, annular seating surfaces 18 and 19, respectively, at the wall in the bore 11 of the body 10, the surface 18 being disposed transversely inward relative to the surface 19. The stepped wall in the bore 11 at the upper end 20 of the valve body 10 has an undercut annular recess 21, desirably of truncated cone section. The transversely-extending bottom wall of the recess 21 intersects an axially-extending, continuous, annular, smooth engaging wall portion 22 of reduced, substantially uniform diameter for maintaining the plug 12 registered centrally of the valve body and for yieldably and frictionally gripping the plug 12 in snug fitting, axially slidable relation.

The stepped wall has a guiding wall portion 23 of enlarged diameter and substantial axial length extending away from the portion 22 toward the end 13a of the valve body to accommodate axial sliding movement of the plug within determinate limits required for the three conditions of the valve assembly. The larger diameter, guiding wall portion 23 provides at its junction with the smaller diameter, engaging wall portion 22 a continuous, annular, smooth shoulder or abutment, desirably of curved section, extending transversely i. e. laterally of the valve body and constituting the upper seating surface 18 of the valve body adapted for fully sealed, mating contact with the plug 12. The region of the larger diameter, guiding wall portion 23 at the outer peripheral margin of and immediately below the seating surface 18 is of substantially uniform diameter, continuous and smooth, and constitutes upper guide means coacting with the engaging wall portion 22 for registering and resisting wobbling of the plug 12 in the valve body. However, the guiding wall portion 23 at its lower region is fluted to provide peripherally i. e. circumferentially spaced-apart, axially-extending, guide lands or ribs 24, 24 separating peripherally i. e. circumferentially spaced-apart, axially-extending grooves 25, 25, desirably of curved section, constituting with the plug 12 individual axial passages of substantial cross-sectional area for conducting the inflating medium.

Adjacent and spaced inwardly from the flanged lower end 13a of the valve body 10, the stepped wall has a relatively narrow, continuous, annular, smooth wall portion 26 of greater diameter than the wall portion 23 to provide for a second, laterally-extending, continuous, annular, smooth shoulder or abutment spaced inwardly from the lower end 13a and having at its inner peripheral margin a junction with the wall portion 23 and constituting the other seating surface 19 adapted for temporary sealing contact with an axially-movable, poppet valve disc 27 of suitable stiff, continuous, lightweight, airtight material and having a slightly reduced diameter relative to the bore diameter at the portion 26. At the flanged lower end 13a the stepped wall may be further recessed to receive snugly a retaining spider 28 of suitable stiff material having spaced-apart portions at its periphery arcuately cut away for passage of the inflating medium, the retaining spider normally being detachably mounted in the bore 11 of the valve body 10 to facilitate the insertion of the poppet valve disc 27 into the bore 11 before the adhesive attachment of the valve assembly to the pneumatic mattress 15.

The retaining spider 28 in the mounted condition together with the valve body 10 at the wall portion 26 provide a cage adapted to slidably receive and floatingly support the poppet valve disc 27. The arrangement permits the valve disc 27 to have a loose fitting relationship with the wall portion 26 in order to function as check valve means and to move axially and perpendicularly from the seating surface 19 under the dynamic pressure of the inflating medium flowing through the passages at 25, 25 into the pneumatic mattress 15, and to move to the seating surface 19 under the static pressure of the inflating medium in the mattress 15 upon cessation of the flow of inflating medium from a conduit 29, for example.

The closed valve plug 12, desirably of one-piece solid construction, may be made wholly of distortable material such, for example, as suitable resilient rubber molded and vulcanized under heat and pressure. Normally, the valve plug 12 is mounted in the stepped bore 11 of the hollow body 10 in non-detachable, axially slidable and limitless rotative relation to the body.

To this end, the valve plug includes a cylindrical stem 30 of substantially uniform diameter adapted for snugly fitting in the bore 11 at the wall portion 22 therein and having at its upper end an annular flange 31 of truncated cone section which is of an outside diameter and thickness and peripheral configuration to mate with the walls in and seat in the truncated cone recess 21 at the upper end 20 of the valve body 10 for the closed condition of the valve assembly, and also to seat at its lower face against the upper end face at 20 of the valve body for the inflating condition of the valve assembly. The cylindrical stem 30 including the flange 31 may be grooved or fluted along the major portion of its length at diametrically opposite portions of the stem and flange to provide a pair of grooves 32, 32 of curved section, substantial width and depth capable of functioning as relatively large passages through which the inflating medium can flow with a minimum of restriction, the wall in each groove 32 at the lower end thereof is curved radially and merges with a smooth, continuous, annular surface portion 33 coextensive with the wall portion 22 in the bore 11. The surface portion 33 of the stem is of a diameter and an axial length sufficient to entirely overlap and snugly fit the smooth wall portion 22 of the valve body 10 and to yieldably and frictionally grip or engage the wall portion 22 when the plug 12 is at its uppermost position for the closed and fully sealed condition of the valve assembly shown in Fig. 2.

The valve stem 30 terminates at its other end in an enlarged or bulbous valve disc engaging portion 34 for disposition snugly in the bore 11 at the wall portion 23 and providing about its upper face and outer periphery a continuous, annular, smooth seating surface 35, desirably of curved section, to abut conformingly and seat sealingly against the upper seating surface 18 of the valve body 10 in the closed condition of the valve assembly. The laterally overlapping abutment of the seating surfaces 18 and 35 prevents pulling the plug 12 entirely out of the valve body in the direction axially outward of the upper end 20. The end face 36 of the stem of the valve plug 12 is adapted to contact the poppet valve disc 27 and compel axial movement of the same toward the retaining spider disc 28 to unseat the poppet valve disc 27 from the seating surface 19 for the deflating condition of the valve assembly.

The plug 12 being resilient as well as distortable can be assembled with the valve body 10 by inserting the plug 12 flanged end first into the bore 11 of the valve body 10 at its flanged end 13 and then applying force axially of the body 10 to the plug at its end portion 34 sufficient to flex and distort the flange 31 such that it will pass successively through the bore at the wall portions 23, 22 and seat in the truncated cone recess 21. The valve disc 27 and the retaining spider can then be disposed in the bore of the valve body. Reversing this procedure and applying axial force to the plug in the opposite direction will result in disassembling the valve assembly. Normally, the enlarged end portion 34 of the plug cannot be distorted sufficiently to pass through the bore at the wall portion 22 and permit full withdrawal of the plug from the valve body at the end 20 thereof.

It is to be understood that instead of both the valve body 10 and the closed plug 12 being of resilient rubber, one of such parts may be made of stiff material such, for example, as stainless steel, brass, aluminum of other corrosion-resisting metal or a thermo-setting plastic resin material, while the other part may be of resilient material and distortable for facilitating assembly of the valve and sealing the same.

In the operation of the valve assembly having the distortable closed plug 12, the poppet valve disc 27 and the retaining spider 28 mounted in the bore 11 of the valve body 10, and with the valve assembly in the inflating condition shown in Fig. 1, the conduit 29 is slipped over the valve body in substantially air-tight relation thereto as shown in Fig. 1. Assuming the pneumatic mattress 15 is in its extended deflated condition, the inflating medium flows from the conduit 29 through the pair of diametrically spaced-apart grooves 32, 32 in the valve plug stem 30 and past the enlarged valve disc engaging portion 34 at the plurality of grooves 25, 25 in the valve body with a minimum of restriction, thereby effecting a piston-like action on the poppet valve disc 27 to compel it to unseat and shift axially away from the seating surface 19 toward the retaining spider 28. The inflating medium flows past the periphery of the valve disc 27 and through the peripheral openings of the spider 28 and the openings 16, 16 in the wall 14 into the interior of the pneumatic mattress 15.

The inflating condition of the valve assembly is always indicated when the flange 31 of the plug 12 seats against the upper end face at 20 of the valve body 10. The stem 30 then projects downwardly into the bore 11 so that the seating surface 35 of the enlarged valve disc engaging portion 34 is spaced axially from the upper seating surface 18 of the valve body and also spaced below the upper ends of the grooves 25, 25 in the wall portion 23 of the valve body. The narrow, smooth, annular wall portion 22 frictionally and resiliently presses against and grips the valve stem 30, while the guide ribs 24, 24 frictionally and resiliently press against and grip the enlarged valve disc engaging portion 34, all of which facilitates maintaining the plug 12 in its inflating position against the pressure of the inflating medium in the mattress.

When the pneumatic mattress 15 has been inflated, the conduit 29 is removed and the plug 12 is pulled part way out by the operator until the seating surfaces 18, 35 are in sealing contact to close the valve assembly. The floating poppet valve disc 27 being operatively responsive to the static pressure of the inflating medium within the pneumatic mattress, initially prevents objectionable leakage through the valve assembly to the atmosphere; since the disc 27 moving axially and seating against the lower seating surface 19 of the valve body under the piston-like action of the pressure of the contained inflating medium on the disc 27, effects a temporary seal by the disc 27 against the seating surface 19, as soon as flow of the inflating medium into the mattress has ceased.

To manipulate the plug 12 so as to close the valve assembly, the thumb and first finger of the operator's hand firmly grasp the fluted stem 30 and flange 31 and exert pulling force axially outward relative to the upper end 20 of the valve body 10 sufficient to overcome the frictional engagement of the valve body and plug and produce axial sliding movement of the plug along the wall in the bore 11 of the valve body until the seating surface 35 of the plug abuts conformingly and sealing against the upper seating surface 18 of the valve body. In this closed position of the plug 12, the smooth, continuous annular wall portion 22 and the smooth, continuous, annular, upper part of the wall portion 23 of the body 10 immediately adjacent the upper seating surface 18 frictionally and resiliently press against and grip, respectively, the stem 30 and the enlarged end portion 34, so as to hold effectively the plug in its closed sealing position shown in Fig. 2, and to resist accidental axially inward sliding movement of the plug tending to break the seal at the seating surface 18 but permit limitless rotation of the plug. The pressure of the contained inflating medium effects a piston-like action against the exposed end face 36 of the plug 12 further facilitating the maintenance of the plug in the closed sealing position without requiring threaded or other locking engagement of the plug and valve body.

Since the space in the bore 11 immediately below the end face 36 of the plug in the closed position is in communication, by virtue of slight leakage generally prevalent about the temporary seal at the periphery of the poppet valve disc 27, through the spider 28 and apertures 16, 16 with the space in the pneumatic mattress 15, any residual pressure within such space in the bore 11 generally becomes equal to that of the contained inflating medium, so that the poppet valve disc 27 normally floats axially downward away from the lower seating surface 19 and rests upon the retaining spider 28 as shown in Fig. 2.

To deflate the pneumatic mattress 15 the operator grasps the fluted stem 30 and flange 31 as described hereinabove and pushes the plug 12 axially inward toward the upper end 20 of the valve body 10 until the flange 31 contacts the end face at 20, and applies additional axial force to distort the flange 31 and seat it conformingly in the truncated cone recess 21, as shown in Fig. 3, so as to yieldably hold the flange 31 flush with upper end of the valve body. The axially inward sliding movement of the plug 12 results in moving the seating surface 35 of the plug substantially away from upper seating surface 18 of the valve body to break the seal whereupon the poppet valve disc 27 under the influence of the internal pressure in the mattress tends to rise upwardly against the lower seating surface 19. However, the end face 36 of the plug contacts and holds the poppet valve disc 27 away from the lower seating surface 19 of the valve body, thereby permitting the contained inflated medium to flow with minimum restriction through the apertures 16, 16 and the bore 11 of the valve body 10 to the atmosphere. The wall portion 22 and the ribs 24, 24 frictionally and resiliently press against and grip the plug 12 to facilitate yieldably holding the same in the deflating position against the piston-like action of the contained inflating medium.

The modified construction of the valve assembly shown in Fig. 8 differs from that shown in Figs. 1 to 7, inclusive, in several aspects. The hollow valve body 40 has the stepped axial bore 41 wherein the truncated cone recess 42 corresponds to the truncated cone recess at 21 of the valve body 10 and the smooth, continuous, annular, engaging wall portion 43 corresponds to the wall portion 22. The guiding wall portion 44 differs from the guiding wall portion 23 in that it has at the upper region thereof adjacent the upper seating surface 45 of curved section, a plurality of relatively short ridges, projections or abutments 46, 46 extending radially inward and disposed circumferentially spaced-apart and adapted to guide and frictionally and resiliently grip the enlarged end portion 47 of the distortable, closed plug 48.

The wall portion 44 at its lower region below the abutments 46, 46 is relatively wide, smooth, and continuously annular and has a diameter substantially greater than that of the enlarged end portion 47 of the plug to provide a continuous, annular passage between the end portion 47 and the wall portion 44 for relatively unrestricted flow of the inflating medium.

The wall in the bore 41 at its counterbored region at the lower flanged end of the valve body 40 provides a second or lower seating surface 49, desirably of curved section, for temporary sealing contact with a continuous, annular sealing portion 50 of the plug 48 extending downwardly and radially outward from the enlarged end portion 47. The sealing portion 50 desirably tapers to a thin edge 50a and is highly and resiliently flexible for effecting a temporary seal at the lower seating surface 49 by flexure and resilient pressing of the edge 50a against seating the surface 49 under the influence of the static pressure of contained inflating medium, while at the same time permitting flow of the inflating medium through the valve assembly into the pneumatic mattress 15 by virtue of flexure of the lip 50a away from the lower seating surface 49 under the dynamic pressure of the inwardly flowing inflating medium. The annular lip-sealing portion 50 of the plug 48 is of relatively greater diameter than that of the wall portion 44 of the valve body 40 and of the end portion 47 of the plug 48, and effects a temporary seal against the seating surface 49 immediately upon cessation of flow of the inflating medium into the pneumatic mattress.

The enlarged end portion 47 of the plug 48 at its upper face and outer periphery has a smooth, continuous, annular seating surface 51 of curved section for mating with and sealingly contacting the upper seating surface 45 of the valve body 40. The stem 52 of the plug 48 may be fluted at diametrically opposite portions of the stem to provide grooves 53, 53 extending from substantially the enlarged end portion 47 throughout the length of the stem 52 including the flange 54 of truncated cone section. The arrangement is advantageous for freedom of flow of the inflating medium through the spaces provided by the fluted construction of the plug 48 and by the abutment and stepped bore construction of the valve body 40.

The modified construction of the valve assembly includes only two pieces, that is, the one-piece valve body and the one-piece, distortable, closed plug, and eliminates the floating poppet valve disc 27 and retaining spider 28 used in the embodiment shown in Figs. 1 to 7, inclusive. The tapered lip portion 50 of the plug itself performs the function of temporarily sealing the valve assembly against leakage of contained inflating medium for the inflating condition of the modified valve assembly, while the wall portion 43 and the abutments 46, 46 frictionally and resiliently press against and yieldably grip stem 52 and the enlarged end portion 47 of the plug to hold it in the inflating position and to yieldably restrain axially upward movement of the plug. This overcomes effectively the tendency of the plug to reciprocate within the bore 41 due to the piston-like action of the tapered lip portion under the static pressure of the inflating medium in the pneumatic mattress. The construction and arrangement of the modified valve assembly provides for the sealing, inflating, and deflating conditions of the valve assembly, and is similar in this aspect to that of the valve assembly shown in Figs. 1 to 7, inclusive.

The improved inflating valve constructions described hereinabove are suitable for inflating and deflating large-volume, low-pressure hollow pneumatic articles, and have provision for extensive freedom of flow of the inflating medium and effective sealing against leakage of the contained inflating medium from the fully inflated article, together with temporary sealing against flow of the inflating medium from the article while inflating the same. The construction has provision for effecting a frictional and yieldable engagement of the valve body and the distortable closed plug by axially slidable movement of the plug, while permitting limitless rotative movement of the plug without breakage of either the fully closed seal or the temporary seal. The distortable closed plug is positively yet yieldably and frictionally held and maintained in its three positions, namely sealing, inflating, and deflating positions, respectively, and also is normally not removable from the valve body, thereby eliminating accidental loss or parts of the valve assembly. The constructions have a minimum number of individual parts which can be conveniently assembled, and both constructions shown in the drawings are advantageously produced accurately and at low cost as by molding and vulcanizing, and provide a reliable, durable valve assembly having effectiveness of operation for the intended purpose.

Variations may be made without departing from the scope of the invention as it is defined in the following claims.

I claim:

1. An inflating valve assembly comprising a tubular body with a stepped bore therein open at both ends of the body and having an inner wall providing a pair of valve seats in said bore spaced-apart axially of the body with each seat spaced axially inward from one of said ends and with one valve seat extending transversely inward from said inner wall relative to the other valve seat, said inner wall having a flow passage therein extending axially intermediate said valve seats and an engaging portion axially outward of and adjacent the inwardly extending valve seat, a closed plug having telescopic limitless rotative movement in said tubular body and having a stem of elastic material in snug fitting slidable contacting relation to said engaging portion for frictional yieldable gripping engagement therewith, said stem having an axially-extending flow passage therein and having a closed end portion spaced axially from such flow passage and disposed intermediate said valve seats, said stem at said closed end portion having a seating surface for sealing against said inwardly extending valve seat to close said valve assembly against exhaust of an inflating medium therethrough and to limit outward telescopic movement of the plug relative to the end of said body nearest the inwardly extending valve seat, and check valve means including a sealing element in the bore of said body adjacent and cooperating with said closed end portion of the plug and movable from and to the transversely outward extending valve seat in response to inward and outward telescopic movement of the plug.

2. An inflating valve assembly comprising a valve body having a bore therein extending in the axial direction from end to end thereof and having an annular inner wall in said bore of stepped construction, said inner wall comprising a pair of axially spaced-apart annular seating surfaces each spaced axially inward from an end of the body and each disposed transversely of the body with one seating surface extending transversely inward relative to the other seating surface, said inner wall comprising an axially ridged guiding portion extending between said surfaces and providing axial flow passages in such wall, and an annular engaging portion axially outward of and adjacent the inwardly extending seating surface, a closed plug having telescopic limitless rotative movement in said body, said plug comprising a stem of resilient rubber material in snug fitting slidable contacting relation to said engaging portion for frictional yieldable gripping engagement therewith, and stem having axial grooves therein and having a transversely enlarged closed end portion at said guiding portion of the body, said closed end portion presenting an annular seating surface facing toward said inwardly extending seating surface of the body for contacting such surface in sealing relation therewith to close said valve assembly against exhaust of an inflating medium therethrough and to limit outward telescopic movement of the plug relative to the end of the body nearest said inwardly extending seating surface, and check valve means including a sealing element in said bore adjacent and cooperating with said closed end portion of the plug and movable from and to the transversely outward extending seating surface of the body in response to inward and outward telescopic movement of the plug.

3. An inflating valve assembly comprising a generally cylindrical valve body having an axial bore of stepped construction therethrough and an annular recess with a bottom wall in said bore at one end of the body, said body having on its inner wall in said bore thereof a pair of internal shoulders constituting a pair of continuously annular valve seats spaced-apart axially of the body with each seat spaced axially inward from an end of the body and with the valve seat nearest said recess extending transversely inward relative to the other valve seat, said inner wall having a continuously annular smooth internal engaging portion in said bore extending axially outward from the inwardly extending valve seat to said bottom wall of said recess and internal guiding means in said bore intermediate the spaced-apart valve seats, a closed plug having telescopic movement in said valve body and having a stem of elastic material and substantially uniform diameter with a flange at one end thereof for seating in said recess of the body to limit inward telescopic movement of the plug, said stem being in snug fitting slidable contacting relation to said internal engaging portion of the body for frictional yieldable gripping engagement therewith and having axially-extending grooves therein and a continuously annular smooth portion spaced axially from said flange and said grooves, said stem at the region of its smooth portion terminating in a closed end portion intermediate the spaced-apart valve seats having a seating surface for sealing against said inwardly extending valve seat so as to close the valve assembly against exhaust of an inflating medium therethrough and to limit outward telescopic movement of the plug, said end portion of the stem being in supported slidable relation to said internal guiding means of said body upon telescopic movement of the plug so as to resist axial tilting movement of said plug relative to said body and to facilitate guiding said seating surface into sealing contact with said inwardly extending valve seat, and check valve means including a sealing element in said bore adjacent and cooperating with said closed end portion of the plug and movable from and to the transversely outward extending valve seat in response to inward and outward telescopic movement of the plug.

4. An inflating valve assembly as defined in claim 3 in which said flange of the plug is annular and of truncated cone form in section and said closed plug comprises resilient rubber throughout said flange and said stem thereof and has a pair of diametrically opposite grooves extending axially through said flange in alignment with said grooves in said stem to provide flow passages for the inflating medium, and in which said end portion of said plug is enlarged transversely of said valve body to provide at the transversely-extending annular upper face of the end portion said seating surface of the plug, and in which said annular recess of said valve body is of truncated cone shape in section for mating with said flange of the plug.

5. An inflating valve assembly as defined in claim 3 in which said valve body comprises resilient rubber throughout and has a transversely-extending annular attaching flange of said rubber at the end of the body remote from said recess thereof, said attaching flange being tapered in section toward its peripheral edge.

6. An inflating valve assembly as defined in claim 3 in which said valve body has in the bore thereof a cylindrical wall portion extending axially away from said outwardly extending valve seat in said bore toward the adjacent end of said body and a spider element in said bore at said adjacent end of the body, and in which said sealing element of said check valve means is a disc valve element in said bore intermediate said outwardly extending valve seat and said spider freely and slidably carried by said body at said cylindrical wall portion thereof and adapted to contact said outwardly extending valve seat, and in which said end portion of said closed plug constitutes means for depressing said disc valve element so as to move the same away from said outwardly extending valve seat to permit exhaust of the inflating medium through the valve assembly.

7. An inflating valve assembly as defined in claim 3 in which said closed plug comprises resilient rubber and has integral with said end portion of the stem said sealing element of said check valve means, said sealing element constituting a continuously annular portion of said resilient rubber projecting transversely outward and downward away from said end portion and tapering in section to a thin edge for flexing against said outwardly extending valve seat to resist exhaust flow of the inflating medium while permitting inflating flow of the inflating medium through the valve assembly, the portion which is tapered being movable with said plug away from said outwardly extending valve seat for exhaust of the inflating medium through the valve assembly.

8. An inflating valve assembly comprising a valve body having a bore therein extending from one end thereof and terminating in a counterbore at the other end thereof to provide in said body an annular recess bounded by an annular sidewall surface and a bottom wall surface in said counterbore, the wall of said body having an internal shoulder in said bore spaced axially inward of the body from said recess and an engaging wall portion in said bore intermediate said recess and said shoulder, and a closed plug having axial sliding movement in said body and including an elastic flange at one end thereof of sufficient dimension laterally of said body to flex elastically and press laterally against said sidewall surface and also seat against said bottom wall surface in said recess so as to releasably interlock and maintain said body and said plug in the open position of the valve assembly and to limit inward sliding movement of the plug, said plug having stem portion extending from said flange along said engaging wall portion of the body in snug fitting slidable contacting relation thereto, and said plug having axial-extending passage means in said stem portion and a seating surface adjacent said stem portion for sealing against said shoulder at the side thereof remote from said bottom wall surface in the recess so as to close the valve assembly against exhaust of an inflating medium therethrough and to limit outward sliding movement of the plug.

9. An inflating valve assembly comprising a valve body formed of resilient rubber throughout having a bore therein extending from one end thereof and terminating in a counterbore at the other end thereof to provide in said body an annular recess bounded by a continuous annular sidewall surface and a bottom wall surface in said counterbore, the resilient rubber wall of said body having an internal shoulder in said bore spaced axially inward of the body from said recess and an engaging wall portion in said bore intermediate said recess and said shoulder, and a closed plug formed of resilient rubber throughout having axial sliding limitless rotative movement in said body and including an annular flange of said resilient rubber at one end thereof of greater diameter than the mouth of said annular recess to flex resiliently and press radially against said sidewall surface and also seat against said bottom wall surface in said recess so as to releasably interlock and maintain said body and said plug in the open position of the valve assembly and to limit inward sliding movement of the plug, said plug having an axially-grooved stem portion extending from said flange along said engaging wall portion of the body in snug fitting slidable contacting relation thereto to facilitate frictional yieldable gripping engagement therewith, and said plug having a seating surface adjacent said stem portion for sealing against said shoulder at the side thereof remote from said bottom wall surface in the recess so as to close the valve assembly against exhaust of an inflating medium therethrough and to limit outward sliding movement of the plug.

10. An inflating valve assembly as defined in claim 9 in which said annular recess in said valve body is of truncated cone shape in cross-section longitudinally of said body with said bottom wall surface being flat and constituting the base of the cone and said continuous annular sidewall surface being inclined radially inward relative to said bottom wall and constituting the side of the cone; and in which said annular flange of said closed plug is of truncated cone shape in cross-section longitudinally of the plug and is of sufficient dimensions to be accommodated in said recess of the valve body and to matingly engage both the inclined sidewall surface and the flat bottom wall surface in said recess for releasably interlocking and maintaining said valve body and said closed plug in the open position of the valve assembly.

References Cited in the file of this patent

UNITED STATES PATENTS

| Number | Name | Date |
|---|---|---|
| 610,253 | Bell | Sept. 6, 1898 |
| 636,465 | Sowle et al. | Nov. 7, 1899 |
| 637,919 | Brown | Nov. 28, 1899 |
| 1,313,554 | Nielsen | Aug. 19, 1919 |
| 1,474,192 | Gressler | Nov. 13, 1923 |
| 1,475,554 | Sahuc | Nov. 27, 1923 |
| 2,103,822 | Perry | Dec. 28, 1937 |
| 2,106,671 | Watson | Jan. 25, 1938 |
| 2,461,620 | Wright | Feb. 15, 1949 |
| 2,574,990 | Waite | Nov. 13, 1951 |